Oct. 6, 1964  J. R. BARRY ETAL  3,151,887
PRESSURE FLUSH RADIATOR CAP
Filed Jan. 8, 1963
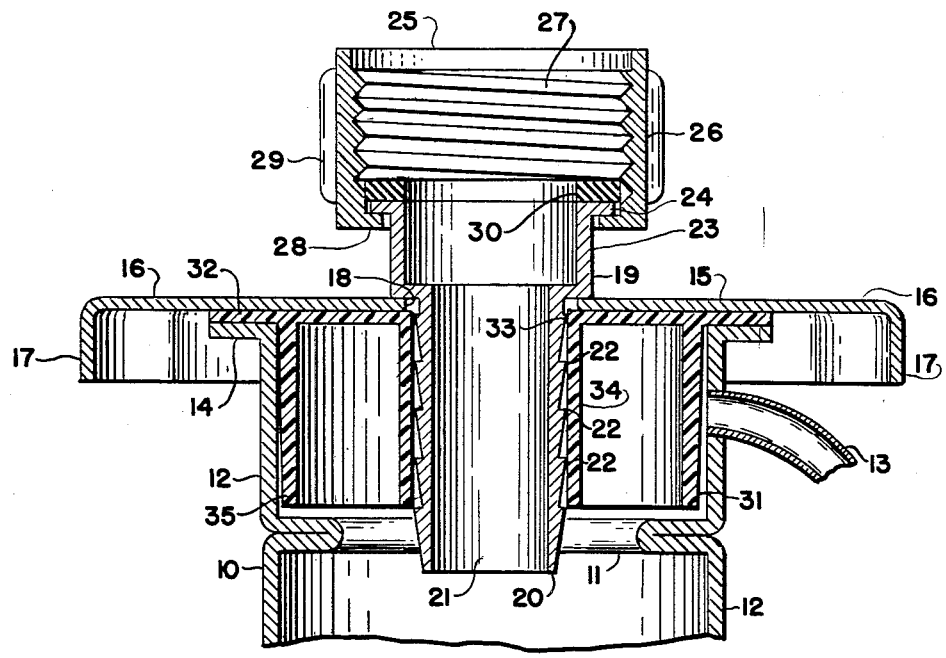
FIG. 1
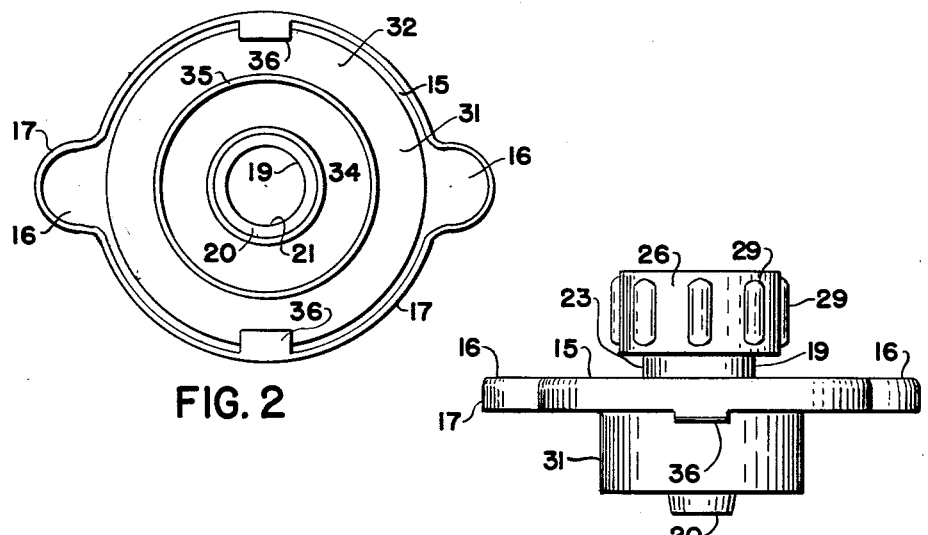
FIG. 2
FIG. 3
INVENTORS:
JAMES R. BARRY
EDWARD G. DOYLE
BY Peter S. Tailer
ATTORNEY

United States Patent Office 3,151,887
Patented Oct. 6, 1964

3,151,887
PRESSURE FLUSH RADIATOR CAP
James R. Barry, 224—17 69th Ave., Bayside, N.Y., and Edward G. Doyle, 842 Van Nest Ave., New York 62, N.Y.
Filed Jan. 8, 1963, Ser. No. 250,053
1 Claim. (Cl. 285—13)

This invention relates in general to radiator caps for automotive vehicles and, more particularly, to a radiator cap adapted to receive a hose to direct a stream of water under pressure into a vehicle radiator.

After a few years use, despite the use of many advertised rust and scale inhibiting additives, automobile and other automotive vehicle radiators will tend to fill up with deposits of sludge and foreign matter which will adhere to the heat transfer surfaces. This foreign matter generally will not flow from the radiator merely by opening the lowermost drain cocks. However, if water is introduced through a radiator cap under pressure, both the cooling passages in the engine block and flow channels in the radiator will be more thoroughly cleaned by a pressure induced flow of clear water.

It is, therefore, an object of this invention to provide a more efficient, more simple, and a less expensive radiator cap which may be used to introduce a flow of pressurized water into the radiator of an automotive vehicle.

Another object of this invention is to provide a more easily assembled radiator cap which may be used to introduce water under pressure into a radiator.

A further object of this invention is to provide a radiator cap adapted to pressure flush a radiator with the radiator cap more easily and more effectively blocking the radiator overflow tube.

Many other objects, advantages and features of invention reside in the particular construction, combination and arrangement of parts involved in the embodiment of our invention and its practice as will be understood from the following description and accompanying drawing wherein:

FIGURE 1 is a transverse longitudinal vertical section through a radiator cap according to our invention;

FIGURE 2 is a bottom view of the radiator cap; and

FIGURE 3 is a side view of the radiator cap.

Referring to the drawing in detail, FIGURE 1 shows the upper neck and filler tube portion 10 of a conventional modern automobile radiator. The filler tube 10 generally has an inwardly extending annular projection 11 folded from the wall 12 of tube 10. The spring loaded bottom portion of a modern pressurized radiator cap (not shown) seats upon the top of annular projection 11 to pressurize the radiator. Leading through the side of filler tube 10 above the inward and annular projection 11 is an overflow drain tube 13 which is designed to conduct water forced past flange 11 from the cooling system. The filler tube 10 has an upper flange 14 on which a conventional radiator cap seats.

As shown in FIGURES 1–3, our radiator cap consists of a disk like cover 15 having two lateral projections 16. A flange 17 extends downward from the periphery of the cover 15 and the lateral projections 16. A central aperture 18 extends through cover 15.

A fitting 19 has a lower portion 20 extending through the aperture 18 in cover 15 and portion 20 contains the internal fluid flow channel 21. The outer surface of lower portion 20 has formed in it a number of upward facing annular barbs 22. Above lower portion 20 fitting 19 has an upper portion 23 of larger diameter terminating in an outwardly extending flange 24.

A female hose connection 25 has a cylindrical body 26 containing the internal threads 27. A lower inwardly projecting annular flange 28 extends under flange 24 to rotatably secure the female hose connection 25 to fitting 19. Projections 29 extend from the sides of the cylindrical body 26 to enable the hand of a user to easily rotate the female hose connection 25. Within hose connection 25 on top of flange 24 there is placed a hose connecting rubber washer 30.

Disposed below cover 15 is the plastic sealing and assembly member 31. Member 31 may be made of rubber or any other flexible material, but it is preferably made of inexpensive and easily molded polyethylene plastic. Member 31 has an upper disk like portion 32 containing a central aperture 33 from about which the circular wall 34 extends downward. The outer circular wall 35 extends downward from the disk like portion 32 and has its outer surface taper slightly inwards.

The pressure flush radiator cap of our invention is assembled in the following manner. Fitting 19 is inserted downward through the female hose connection 25. The flexible sealing and assembly member 31 is then placed below the disk like cover 15 and the lower portion 20 of fitting 19 is inserted downward through aperture 18 of cover 15 and through aperture 33 of the sealing and assembly member 31. Circular wall 34 is made with a slightly smaller diameter than the upward facing annular barbs 22 of fitting 19. Thus the barbs 22 slide relatively easily within the circular wall 34 deflecting and stretching its resilient material. When upper portion 23 of fitting 19 seats on cover 15, the barbs 22 tend to dig into the plastic of circular wall 34 to lock and secure the assembled pressure flush radiator cap together. Thus the radiator cap for pressure flushing of our invention is assembled with one simple operation which requires no special fastening means.

The pressure flush radiator cap of our invention is used and functions in the following manner. As shown in FIGURE 2, two inwardly projecting lugs 36 are bent inward from the lower portion of the sides of flange 17. These lugs fit downward through cut out portions (not shown) of the upper flange 14 of filler tube 10. When cover 15 is then rotated, the lugs 36 move beneath flange 14 to lock cover 15 to the filler tube 10. The disk like portion 32 has its peripheral portion extend between cover 15 and flange 14 to act as a seal. The taper of outer circular wall 35 enables member 31 to fit easily into the filler tube 10. A conventional garden hose (not shown) may be hooked to a faucet and have its male connection inserted in the female hose connection 25 which is rotated to be screwed about it. When the faucet is opened, water is introduced under line pressure through the hose and through the internal flow channel 21 into the radiator. As pressure builds up within the radiator, it forces the circular wall 34 inward against the lower portion 20 to form an effective hydraulic seal. In addition, as pressure builds up within filler tube 10, the overflow drain tube 13 will relieve pressure along the side of one part of the outer circular wall 35. The resilient and flexible outer circular wall 35 will then be forced over against overflow drain tube 13 to effectively block and seal it. When pressure is relieved in the radiator, outer wall 35 assumes its normal shape and may be easily withdrawn with the pressure flush radiator cap. Thus it may be seen that our pressure flush radiator cap is screwed in position and introduces water under pressure into filler tube 10 while providing a complete and effective hydraulic seal.

While we have disclosed our invention in the best form known to us, it will nevertheless be understood that this is purely exemplary and that modifications may be made without departing from the spirit of the invention except as it may be more particularly limited in the appended claim wherein we claim:

A pressure flush radiator cap for use on an automotive vehicle having a radiator filler tube, an overflow drain tube leading from the side of said filler tube near the top of said filler tube, and an upper outwardly extending flange of said filler tube; said pressure flush radiator cap comprising, in combination, a cover adapted to be secured over the upper flange of said filler tube, said cover containing a central aperture, a fitting having a large diameter upper portion and a smaller diameter lower portion, said lower portion extending through the aperture in said cover and having upward facing annular barbs on said lower portion, said fitting having a longitudinal internal flow channel extend therethrough, said large diameter upper portion of said fitting seating on said cover about the central aperture in said cover, the large diameter upper portion of said fitting having an outwardly extending annular flange, a female hose connection having an inwardly extending annular flange at the lower end of said female hose connection, said inwardly extending annular flange of said female hose connection extending about the large upper portion of said fitting below the outwardly extending annular flange of said fitting rotatably securing said female hose connection to said fitting, and a sealing and assembly member of resilient material, said sealing and assembly member having a disk like upper portion, the periphery of said disk like upper portion extending between said cover and the upper outwardly extending flange of said filler tube, said sealing and assembly member containing a central aperture and having an inner cylindrical wall extending downwardly from about said central aperture, said inner cylindrical wall being of slightly smaller diameter than the annular barbs of the lower portion of said fitting, said lower portion of said fitting being forced through said inner cylindrical wall so that said annular barbs engage said inner cylindrical wall, said sealing and assembly member having an outer cylindrical wall extending downwardly within and close to said filler tube below said overflow drain tube.

References Cited in the file of this patent
UNITED STATES PATENTS

| | | |
|---|---|---|
| 2,387,324 | Glickman | Oct. 23, 1945 |
| 2,465,895 | March | Mar. 29, 1949 |
| 2,784,864 | Di Giorgio | Mar. 12, 1957 |
| 3,034,521 | Greenfield | May 15, 1962 |